United States Patent [19]
Speck et al.

[11] Patent Number: 5,864,313
[45] Date of Patent: Jan. 26, 1999

[54] PROCESS FOR DETERMINING THE INTERMEDIATE FREQUENCY DEVIATION IN FREQUENCY PULSED RADAR SYSTEMS

[75] Inventors: Ralph Speck, Friedrichshafen; Joachim Flacke, Markdorf; Bruno Kaiser, Kippenhausen, all of Germany

[73] Assignee: Dornier GmbH, Germany

[21] Appl. No.: 750,373

[22] PCT Filed: Apr. 4, 1996

[86] PCT No.: PCT/DE96/00600

§ 371 Date: Aug. 29, 1997

§ 102(e) Date: Aug. 29, 1997

[87] PCT Pub. No.: WO96/31786

PCT Pub. Date: Oct. 10, 1996

[30] Foreign Application Priority Data

Apr. 6, 1995 [DE] Germany .................. 195 12 904.0

[51] Int. Cl.[6] .................................................. G01S 7/28
[52] U.S. Cl. ........................ 342/98; 342/99; 342/21; 342/101
[58] Field of Search ................. 342/21, 98, 99, 342/100, 101, 175, 194, 197, 189

[56] References Cited

U.S. PATENT DOCUMENTS

| | | | |
|---|---|---|---|
| 3,725,915 | 4/1973 | Herman et al. | 342/25 |
| 3,768,096 | 10/1973 | Dentino | 342/25 |
| 4,014,019 | 3/1977 | Fetter | 342/26 |
| 4,485,383 | 11/1984 | Maher | 342/352 |
| 4,538,149 | 8/1985 | Wehner | 342/194 |
| 4,547,775 | 10/1985 | Wehner et al. | 342/201 |
| 4,616,229 | 10/1986 | Taylor, Jr. | 342/171 |
| 4,721,924 | 1/1988 | Masdea et al. | 331/1 R |
| 5,036,327 | 7/1991 | Dannenberg | 342/201 |

FOREIGN PATENT DOCUMENTS

A 2 571 909   4/1986   France .

Primary Examiner—John B. Sotomayor
Attorney, Agent, or Firm—Evenson, McKeown, Edwards & Lenahan, P.L.L.C.

[57] ABSTRACT

The invention relates to a process for determining the deviation of the intermediate frequency from a given reference frequency ($f_R$) in the case of a frequency-pulse radar system, characterized by the time-related scanning of the echo signal such that, from an echo pulse of an individual target, several scanning values are obtained at different, preferably equidistant points in time within the echo pulse, the Doppler filtering by way of the thus obtained scanning values of an individual target so that several Doppler signals of the same frequency are obtained from the same target from whose phase differences the intermediate-frequency deviation is determined.

7 Claims, 11 Drawing Sheets

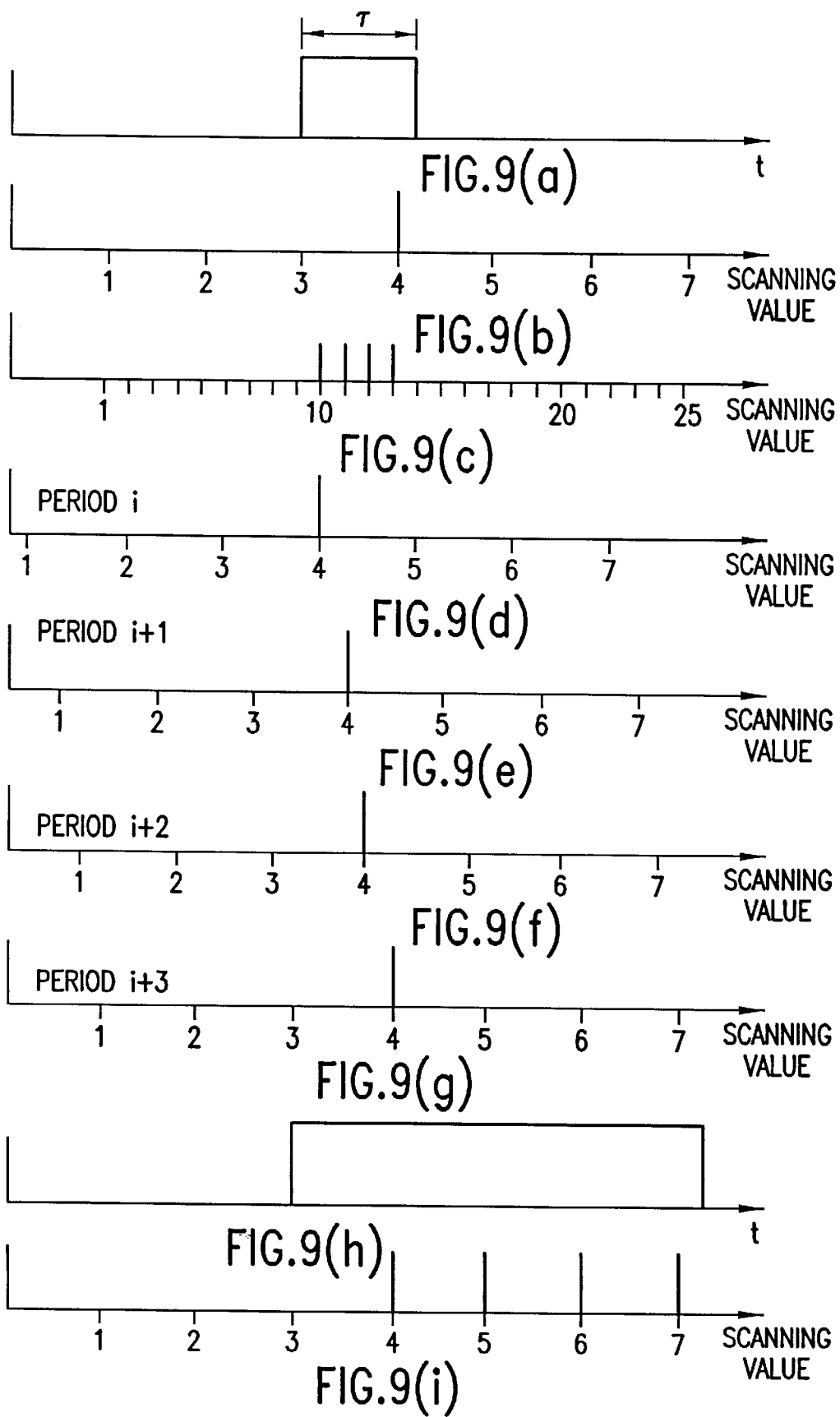

PROCESS FOR DETERMINING THE INTERMEDIATE FREQUENCY DEVIATION IN FREQUENCY PULSED RADAR SYSTEMS

BACKGROUND AND SUMMARY OF THE INVENTION

This invention relates to a process for determining the intermediate-frequency deviation in a frequency-pulse radar system.

In frequency-pulse radar systems, as a result of frequency shift keying, the transmission oscillator is also used as a local oscillator (LO). The basic block diagram of such a radar system is illustrated in FIG. 1, which corresponds to the system described in German patent document DE 41 04 907. For generating transmission pulses, the voltage controlled oscillator (VCO) is switched to the transmission frequency $f_s$ during the transmission interval, while in the remainder of the pulse repetition interval $T_p$ it remains on the LO-frequency $f_{LO}$. For further details of the system illustrated in FIG. 1, reference is made to German Patent Document DE 41 04 907.

Illustration (a) of FIG. 2 shows the oscillator frequency as a function of time. The corresponding time sequence of the amplitude of the transmission signal and of the amplitude of the LO-signal (with the frequencies $f_s$ and $f_{LO}$) is found in Illustrations (b) and (c) of FIG. 2. The difference between the transmission frequency and the LO-frequency ($f_s - f_{LO}$) is the intermediate frequency IF, which is determined by the frequency shift of the oscillator.

Illustration (d) of FIG. 2 shows the time sequence of the echo signal with the frequency $f_s + f_{Doppler}$. Since this echo signal is delayed corresponding to the target distance R by Tz=2R/c (c=speed of light), it can be mixed onto the intermediate frequency IF in the radar system with the transmission oscillator switched over in the interim to LO-frequency. The time sequence of the amplitude of the intermediate-frequency echo signal, which is displaced here by a Doppler frequency in the case of a moved target, is shown in Illustration (e) in FIG. 2.

As described in German patent document DE 41 04 907, the transmission signal $f_s$ and the LO-signal ($f_{LO}$) are coherent because they are generated by the frequency shift keying of the same oscillator. The intermediate-frequency pulses, which are generated by the mixing of both signals, are therefore phase-stable from pulse to pulse (apart from a possible Doppler shift), as well as coherent with respect to the control signal (pulse repetition frequency PRF) which controls the frequency shift keying of the oscillator. As a result of the coherence of IF and PRF, by means of a reference signal $f_R$ coherent to the PRF, the IF-signal can be mixed coherently into the base band, where the sampling and the filtering of the Doppler signal is obtained from the phase differences between the IF signal and the reference signal ($f_R$) (see also Merill I. Skolnik: "Introduction to Radar Systems", 2 nd Edition 1980, Page 117, Publishers McGraw-Hill, N.Y.).

The sampling takes place in range cells whose width (sampling time $T_A$) normally corresponds to the pulse width τThe range cells are combined with respect to time, and each range cell reflects a certain distance range corresponding to its delay with respect to the transmission pulse. The range cell width is determined by the duration of the sampling ($T_A$) and determines the range resolution (Δ R) of the radar ($\Delta R = c \cdot T_A/2$, c= speed of light).

FIG. 3 shows the time sequences of the transmission signal, the echo signal and the arrangement of the range cells for an interval of the pulse repetition frequency. The transmission signal (a) has the pulse width. The center representation (b) is an example of an echo signal with 5 targets at different distances. (The difference in the distance must be larger than $T_A$ in order to be able to detect the individual targets as separate objects.) The range cells 1 to n, which cover the whole range measuring area, are illustrated in Representation (c). In the respective range cells, the sampled value (amount of the complex echo signal in the base band plane, $\sqrt{(I^2+Q^2)}$) corresponds to the amplitude of the echo signal at the sampling point in time, as illustrated in Representation (d) of FIG. 3.

For a defined range cell, which contains a target moving relative to the radar, the course of the sampling values over an extended time period is illustrated in FIG. 4. The target causes a Doppler shift which is represented by the envelope of the sampling values. The sampling values have a time interval of 1/PRF. Within the sampling time $T_A$, the change of the Doppler signal is negligibly low because $1/T_A \gg f_{Dmax}$ ($f_{Dmax}$=maximal Doppler frequency) applies. This is shown in FIG. 5 in which two successive sampling values within a range cell are illustrated.

If the frequency of the intermediate-frequency echo signal and thus the frequency shift of the transmission oscillator deviates from the normally crystal-stabilized reference frequency $f_R$, the signal-to-noise ratio is reduced correspondingly. The effect of such a deviation is illustrated in FIG. 6. Superposition of the intermediate-frequency deviation reduces the amplitude of the Doppler signal. The frequency deviation permissible for a certain radar depends entirely on the duration of the sampling ($T_A$), the tolerable reduction of the signal-to-noise ratio and the sampling time of the system. Thus, for example, for a cross-correlation receiver (matched filter, $T_A=\tau$), with a permitted deterioration of 1 dB of the signal-to-noise ratio and a reception gate width of 10 m, the permissible IF-deviation is less than 4 MHz. Particularly in the case of radar systems in the mm-wave range, where normally free-running oscillators of relatively low quality are used, problems occur with respect to the frequency stability. Thus, for the mentioned example with a range cell of a 10 m width, the frequency shift of a mm-wave oscillator which is switched, for example, from 76.4 GHz to 76.6 GHz and thus achieves an intermediate frequency of 200 MHz in the system, must be precisely adjusted to +2.5% (=+4 MHz). Because of component fluctuations and manufacturing tolerances as well as influences of temperature and aging effects, not only a frequency compensation in the manufacturing process is required but also a frequency stabilization during the operation. Particularly in the case of systems which are produced in large piece numbers, both measures may result in increased expenditures and therefore in higher costs.

The effect of the deterioration of the signal-to-noise ratio because of the deviation of the intermediate frequency from the reference frequency $f_R$ is explained by means of FIG. 7 on the example of a cross-correlation receiver. The principle of the cross-correlation receiver is described, for example, in Merill I. Skolnik: "Introduction to Radar Systems", 2nd Edition 1980, Pages 369 to 376, Publishers McGraw-Hill, N.Y. The time sequence of the video signal (broken line) caused by the IF-deviation is shown in FIG. 7 as well as the influence of this signal on the sampling. The high-frequency change within the sampling gate (range cell) determines the content of energy in the respective gate.

FIG. 8 shows different time sequences (a) to (d) of the echo signal in a single sampling gate, specifically for the real signals I and Q, before the integration takes place at the cross-relation receiver or matched filter. In this case, in the examples (a) to (d), different magnitudes of deviations of the intermediate frequency IF from the desired value exist in each case. Representation (a) shows the ideal case, that is, the intermediate frequency is identical with the reference frequency. In this case, the correlations maximum is $$|U|_{max} = \sqrt{\left(\int_{10}^{10+\tau} I(t)dt\right)^2 + \left(\int_{10}^{10+\tau} Q(t)dt\right)^2} = \sqrt{(A\cdot\tau)^2 + \sigma} = A\cdot\tau$$

In the other representations (b) to (d), differently than in case (a), the voltage at I or Q is no longer constant over the pulse width. This is the result of a frequency deviation of the intermediate frequency from the reference frequency. For this reason, in Examples (b) to (d) the correlation maxima also become smaller than in Example (a). The following table summarizes the effects on the signal-to-noise ratio for the Examples (a) to (d) illustrated in FIG. 8.

| Representation | IF-Deviation | Correlation Maximum | Loss of Signal-to-Noise Ratio in dB |
|---|---|---|---|
| (a) | 0 | $A\cdot\tau$ | 0 |
| (b) | $\frac{1}{4\tau}$ | $A\cdot\frac{2\tau}{\pi}\sqrt{2}$ | 1 |
| (c) | $\frac{1}{2\tau}$ | $A\frac{2\tau}{\pi}$ | 4 |
| (d) | $\frac{1}{\tau}$ | 0 | ∞ |

The difficulty in the case of frequency-pulse radar systems with one oscillator is that the transmission frequency and the LO-frequency are generated by the oscillator in time-sequence. Both signals therefore are never present at the output of the oscillator at the same time. To generate a IF-signal within the system which could be used for the control would require very high expenditures particularly in the case of mm-wave systems and would raise the cost (for example, delay elements in the mm-wave range).

It is an object of the present invention to provide a process by means of which, in a simple manner and at reasonable cost, deviation of the intermediate frequency (IF) from the desired value ($f_R$) (=deviation of the frequency shift from the desired value) can be measured in a frequency-pulse radar system according to German patent document DE 41 04 907.

According to the invention, this object is achieved by deriving information concerning the IF-deviations from the normal echo signals of the radar system, without additional devices in the front end (such as delay elements). This means that the echo signal of a potential target is divided into range cells by means of the standard signal processing, and is doppler-filtered. It will therefore be available with a sufficient S/N (signal-to-noise ratio).

Other objects, advantages and novel features of the present invention will become apparent from the following detailed description of the invention when considered in conjunction with the accompanying drawings.

BRIEF DESCRIPTION OF THE DRAWINGS

FIG. 9 shows wave diagrams which illustrate three alternative methods for increasing the number of sampled values within a single echo pulse according to the invention;

DETAILED DESCRIPTION OF THE INVENTION

Figure 1:
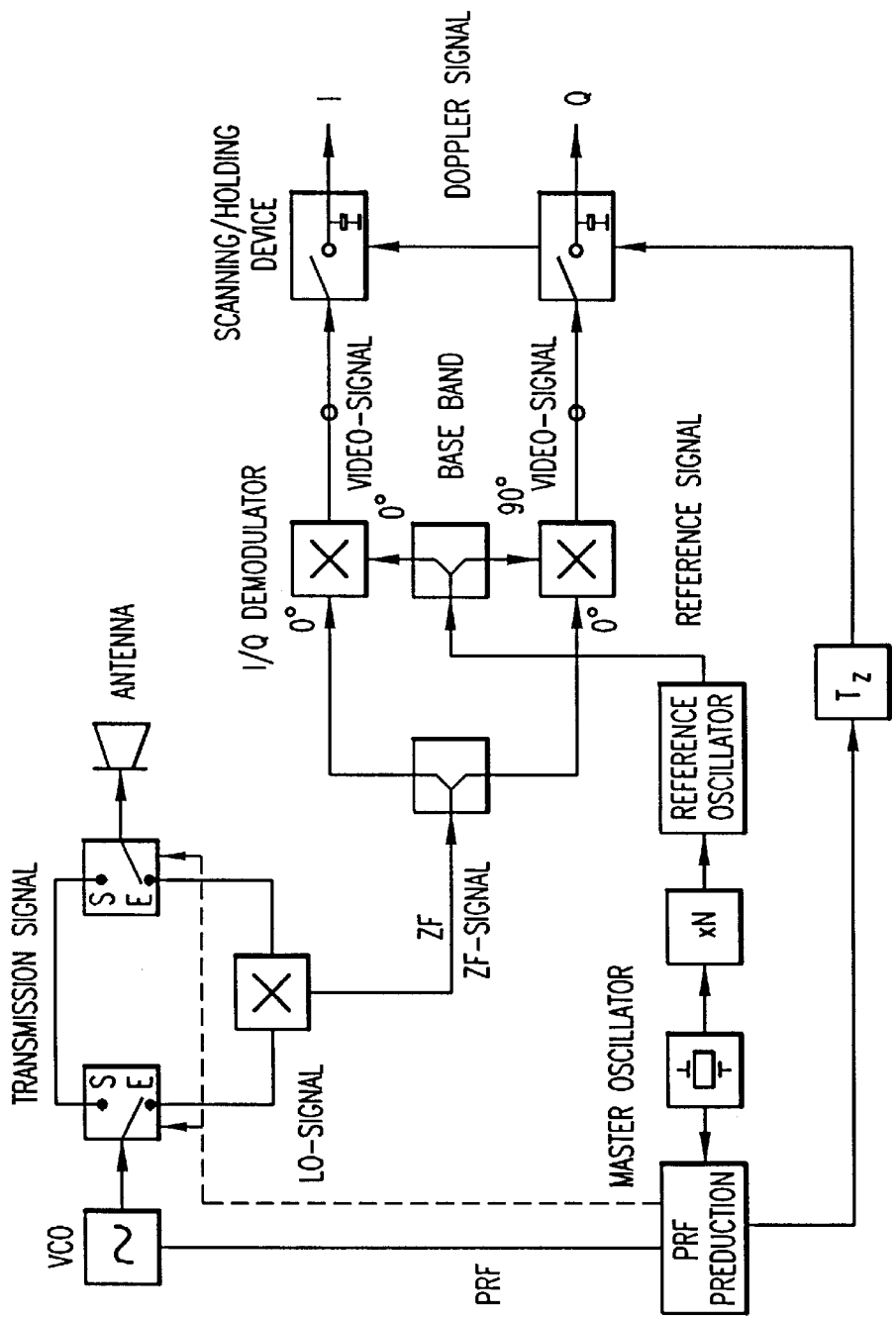
FIG. 1 is a schematic block diagram of a frequency-pulse radar system for implementing the invention.
Figure 2A:
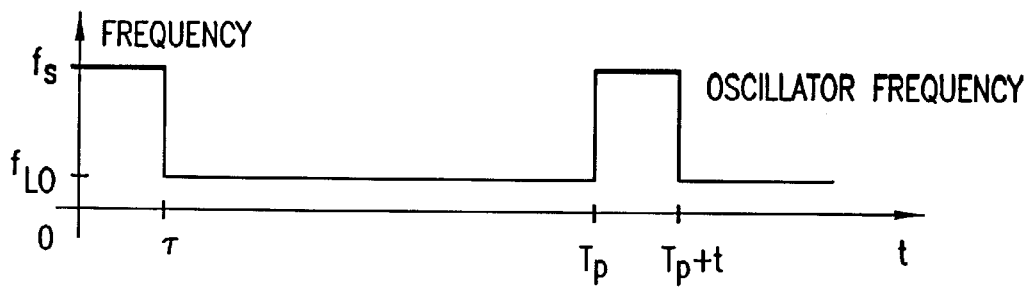
FIG. 2 shows wave diagrams which illustrate the operation of the frequency-pulse radar system of FIG. 1.
Figure 2B:
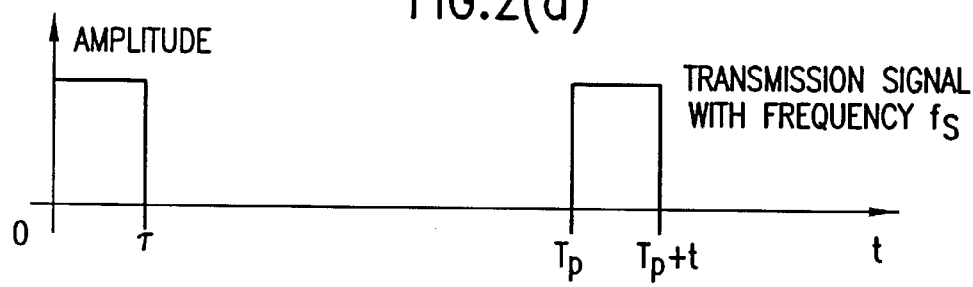
Figure 2C:
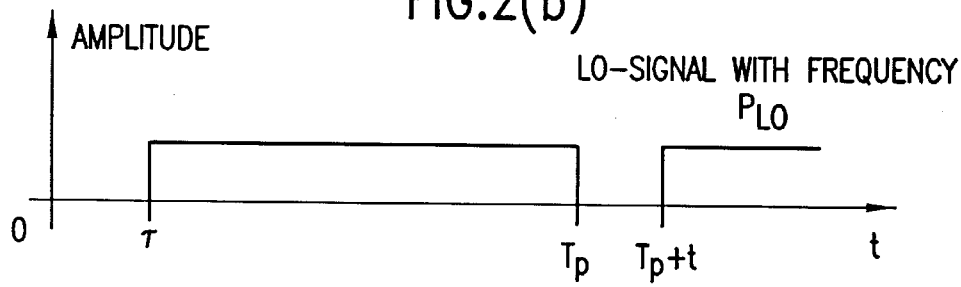
Figure 2D:
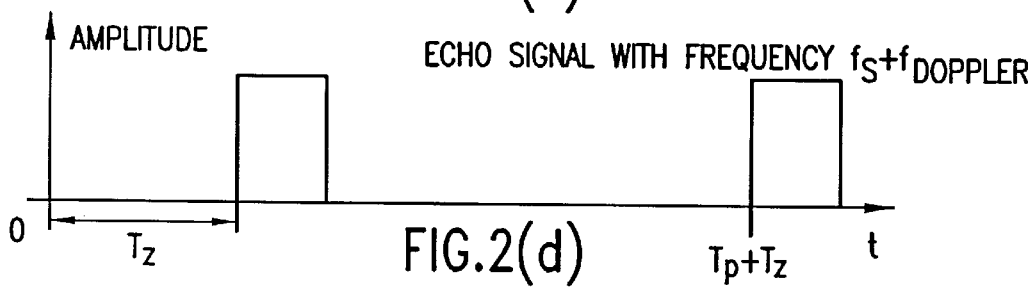
Figure 2E:
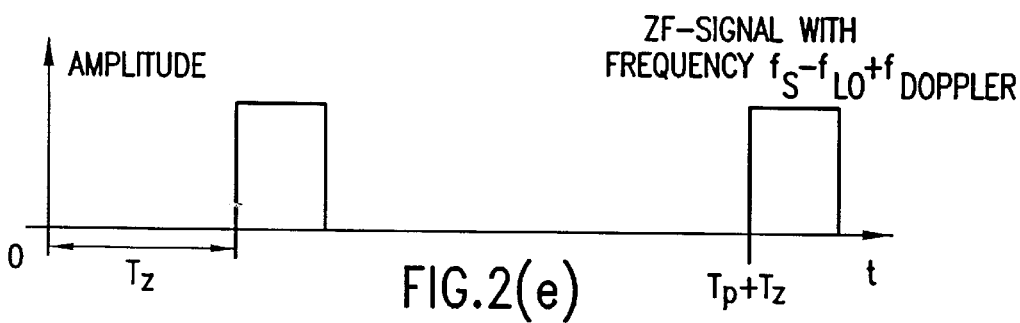
Figure 3A:
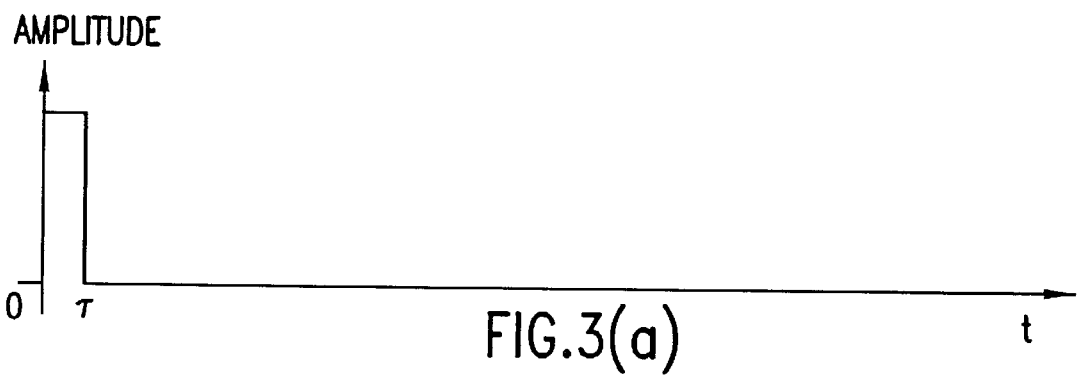
FIG. 3 shows wave diagrams of emitted and received pulses for the frequency-pulse radar system of FIG. 1.
Figure 3B:
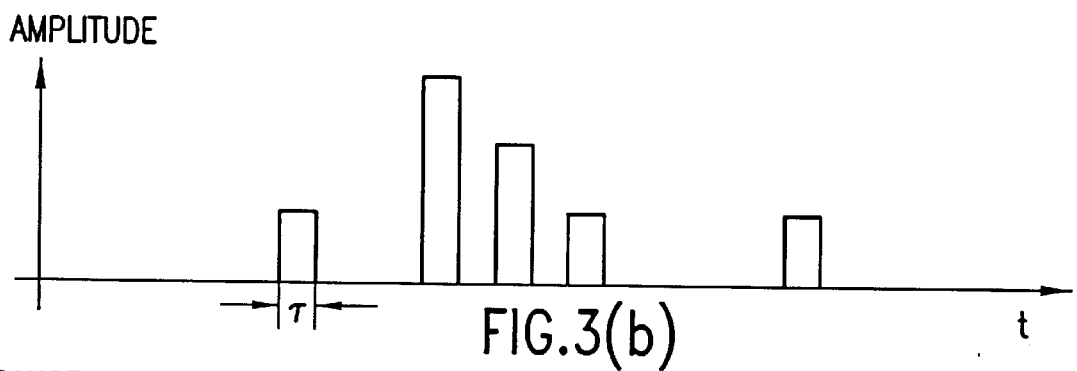
Figure 3C:
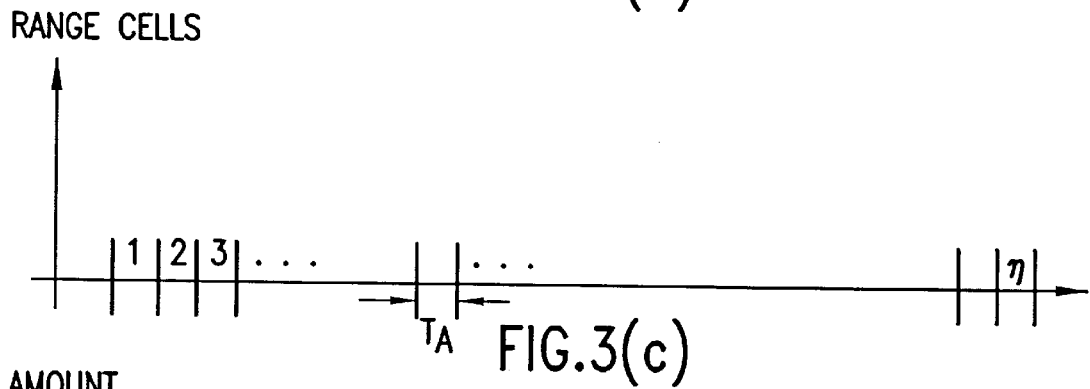
Figure 3D:
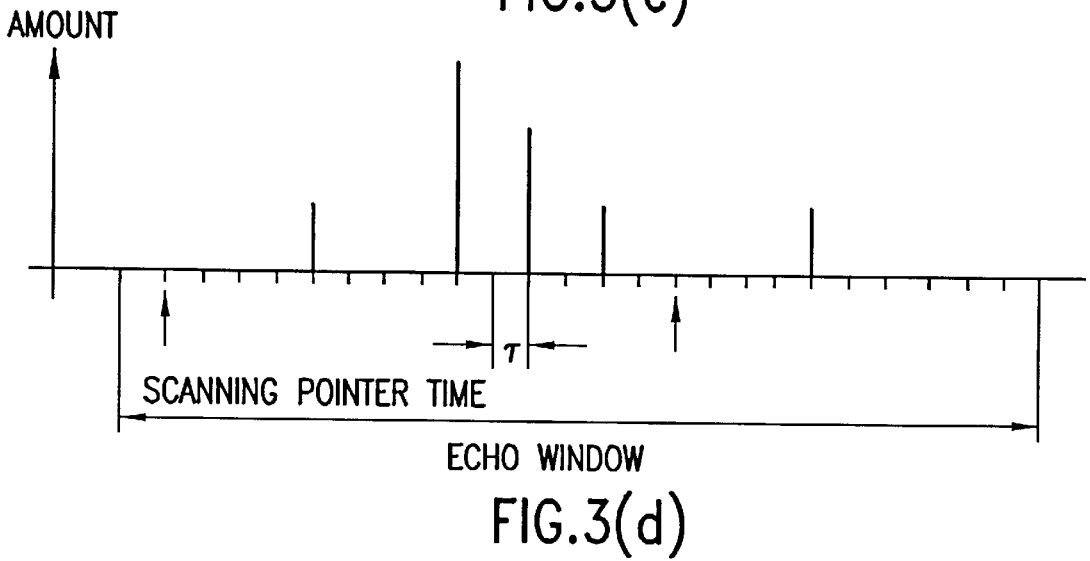
Figure 4:
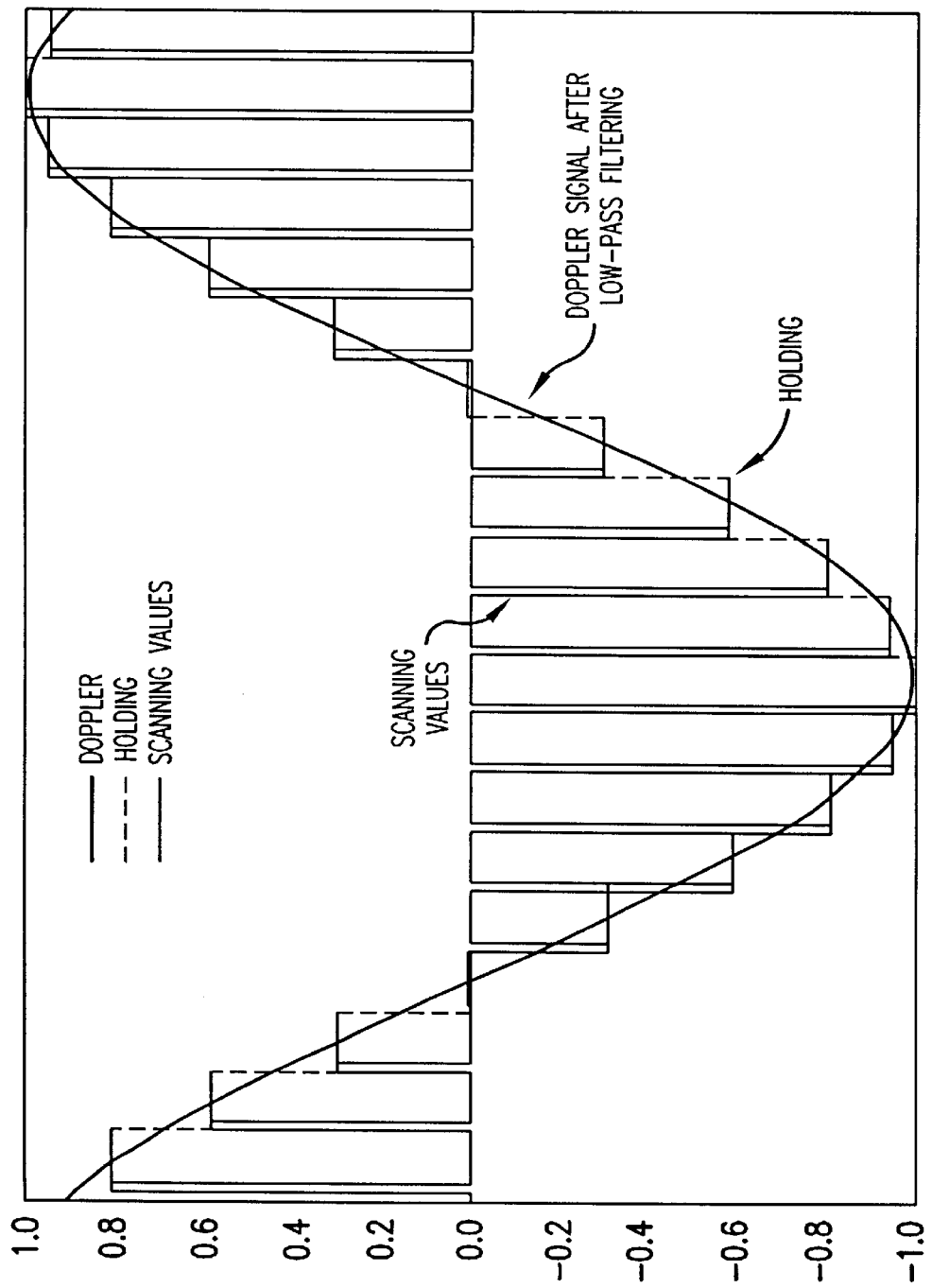
FIG. 4 shows the sampled values generated at a particular range cell by a moving target over an extended time period.
Figure 5:
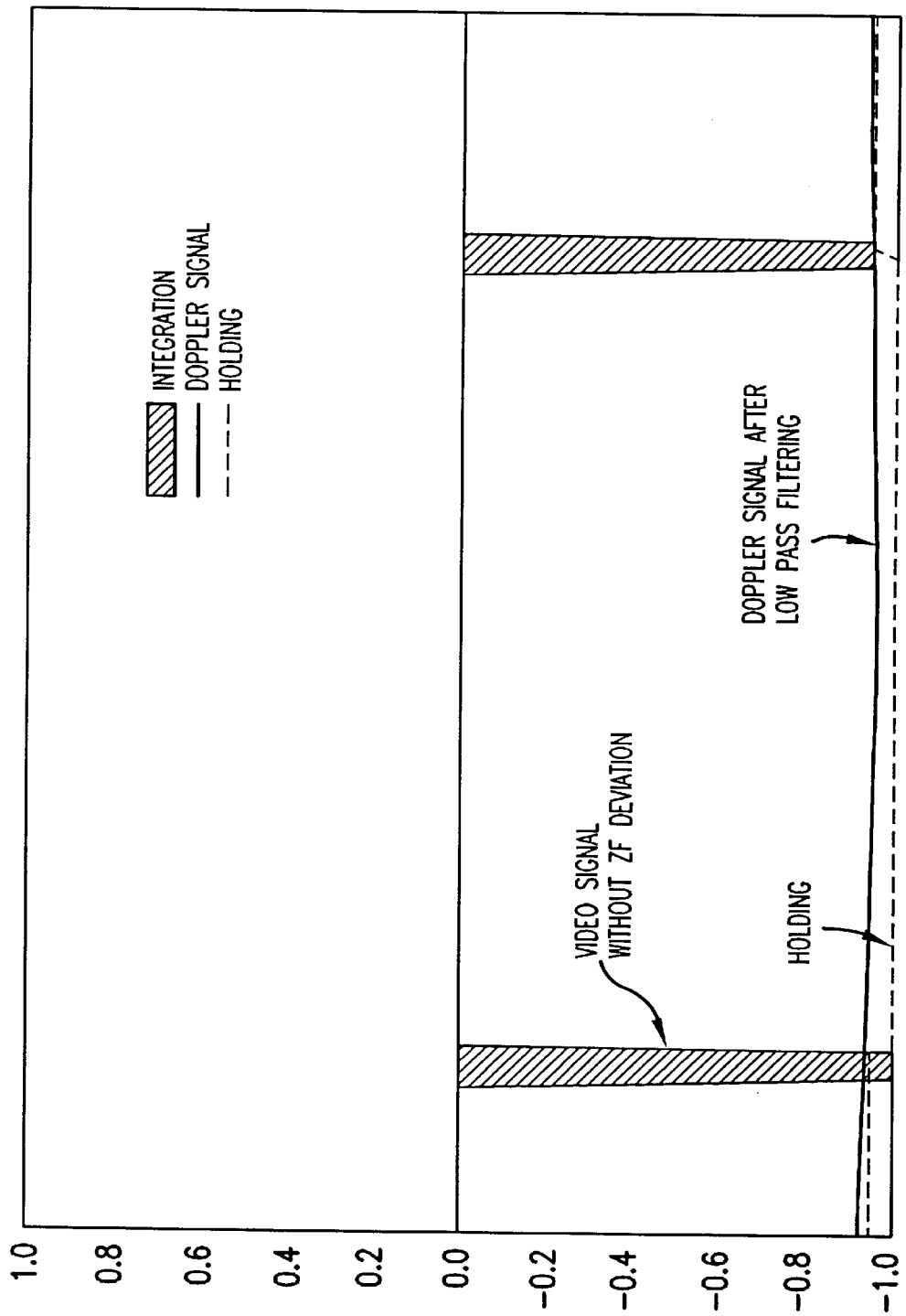
FIG. 5 shows two successive sampled values from FIG. 4, with an expanded time scale.

Division of the echo pulse into range cells takes place by the time-related sampling of the echo signal. It is thus important that the echo signal of an individual target is sampled such that several (for example, n) sampling values are present within an echo pulse. Thus, n Doppler signals of the same Doppler frequency are generated of one and the same target, from whose phase differences the IF-deviation (for example, by means of FFT for $n=2^k$) can be determined. If permitted by the filter band widths in front of the sampling device, as a result, in the case of sampling durations $T_A$ and directly successive sampling, frequency deviations in the range of $+1/(2\bullet T_A)$ can be determined.

The following possibilities exist for generating n sampling values within an echo pulse:

1. Increase of the Regular Sampling Rate (=1 Sampling Value per Range Cell) by the Factor n Advantages of this technique are the unchanged transmission signal form and the high clearness range for the frequency measurement. In the case of a complete sampling of the echo pulse with n successive sampling values, the clearness range is limited to $+1/(2\bullet T_A)$.

A disadvantage of this approach, however, resides in the increase of the sampling frequency by the factor n. Particularly in the case of radar systems with a high distance resolution, this results in high sampling rates.

2. Sampling Points in Time Offset by $T_A$ from Echo Pulse to Echo Pulse

In addition to the advantages of 1., this approach achieves an unchanged sampling rate. The effective PRF, which is reduced by the factor n, however, may be a disadvantage.

3. Temporarily Widening the Transmission Pulse to the Duration $\tau=k\bullet T_A$ So That the Echo Signal of a Target Extends along k Regular Range Cells of the Width $\Delta R=c\bullet T_A/2$, and thus along k Regular Sampling Points in Time An advantage of this process is the unchanged sampling in the receiver. The generation of an additional transmission signal form, however, may be a disadvantage. In this case, the unambiguous range is limited to $+1/(2 \cdot T_A)$, Depending on the particular application, the above-described processes can be used individually or combined in order to determine the deviation of the intermediate frequency from the desired value in a manner described in more detail hereinafter. After the calculation of the intermediate frequency deviation, this intermediate frequency deviation can then be kept to a minimum by a corresponding correction of the frequency shift of the transmission/local oscillator in a closed control loop.

The three process alternatives according to Number 1,2,3 will be explained in detail by means of FIG. 9.

Illustration (a) shows an echo pulse of the width $\tau$ and Illustration (b) shows the result of the known sampling with the sampling rate=$1/T_A$ corresponding to FIG. 3($d$). Illustration (c) shows the implementation of the process according to the invention corresponding to Number 1. In comparison to the regular sampling rate according to Illustration (b), the sampling rate was increased by the factor 4. As a result, changes within the pulse width $T_A=t/4$ (compare FIG. 8) can be clearly sampled.

Illustrations (d) to (g) relate to the implementation of the process according to the invention corresponding to Number 2. In this embodiment, the sampling points are offset in time by $\tau/4$ from one echo pulse to the next. In the illustrated case, 4 periods must pass before the 4 sampling values of the echo signals are obtained. This means that the echo signal must remain unchanged during this time. The effective pulse repetition frequency PRF is thus reduced by the factor 4.

Illustrations (h) and (i) relate to the implementation of the process according to the invention corresponding to Number 3. Illustration (h) shows the widening of the echo pulse based on a corresponding widening of the transmission pulse by the factor 4. In this case, the regular sampling can be maintained as in Representation (b). However, as shown in Illustration (i), because of the quadruple echo pulse length, 4 sampling values are generated per echo pulse.

Figure 6:
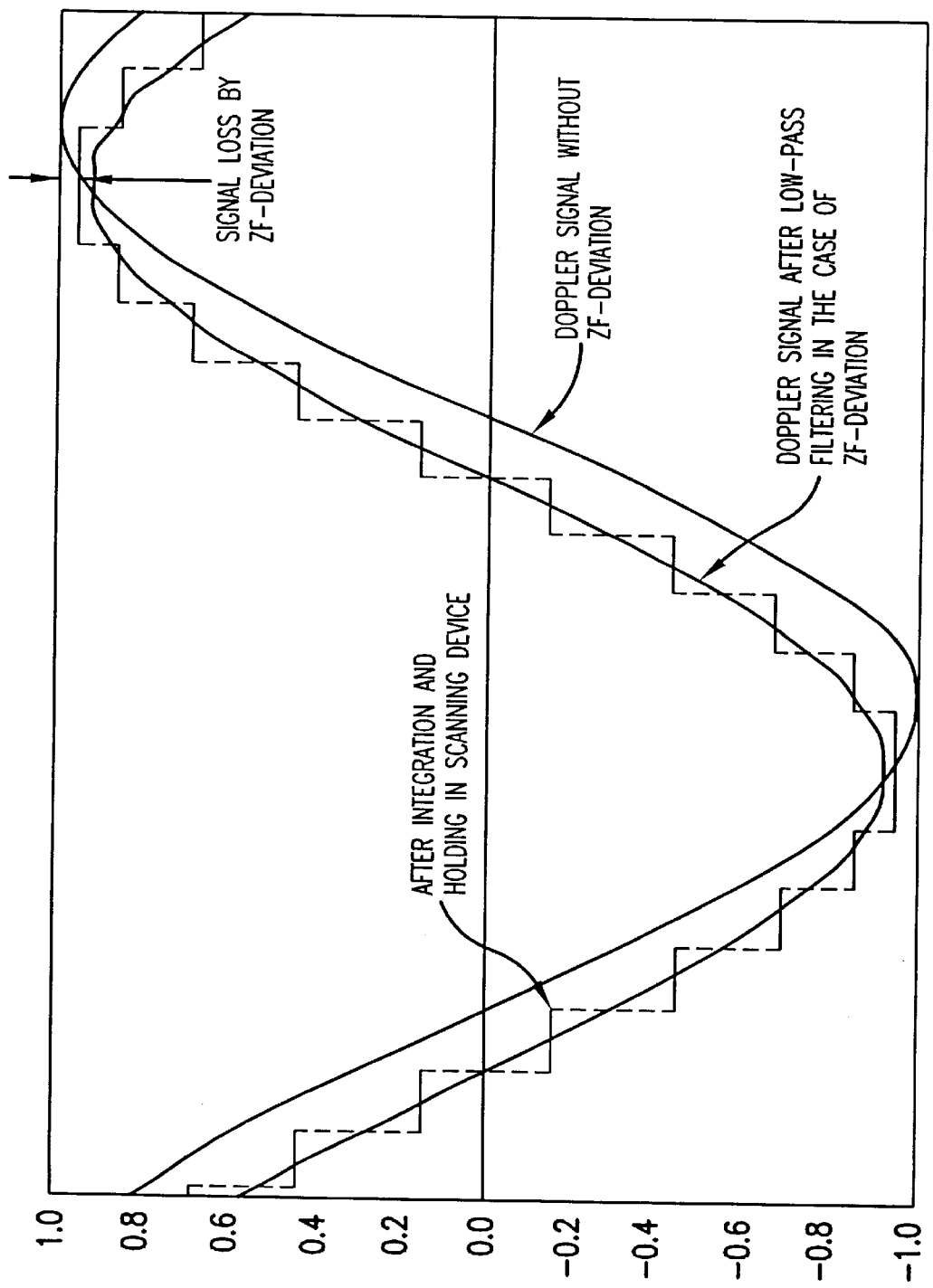
FIG. 6 is a wave diagram which illustrates the effect of a deviation of the frequency shift of the transmission oscillator.
Figure 7:
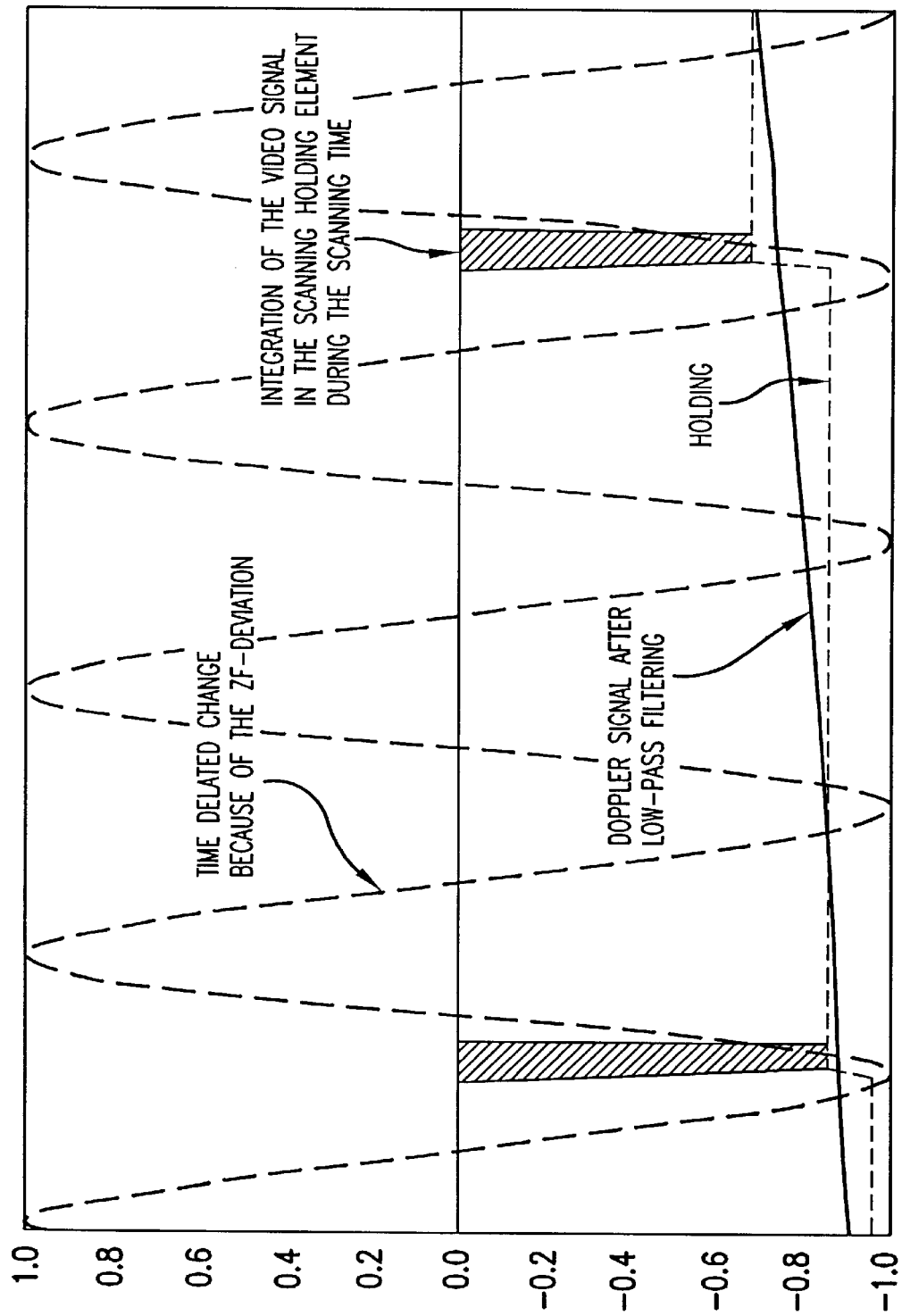
FIG. 7 is a wave diagram which illustrates the effect of a deterioration of the signal to noise ratio due to deviation of the intermediate frequency signal from the reference frequency.
Figure 8A:
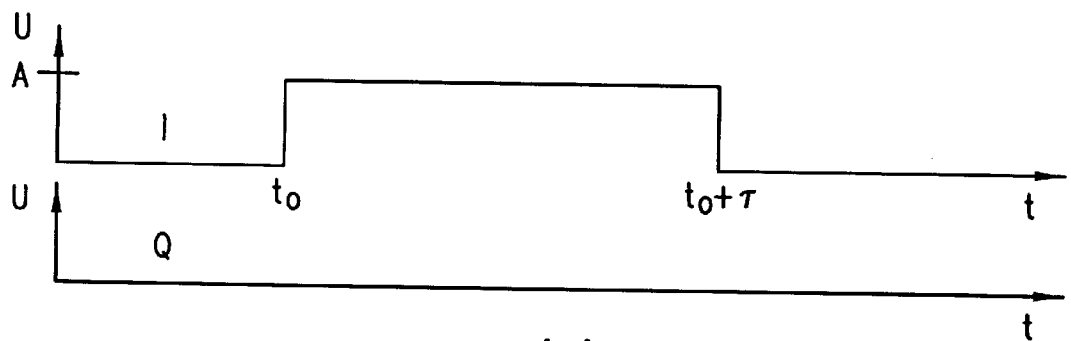
FIG. 8 shows the time sequence of the signals I and Q at a single sampling gate, for different amounts of deviation of the intermediate frequency from the desired value.
Figure 8B:
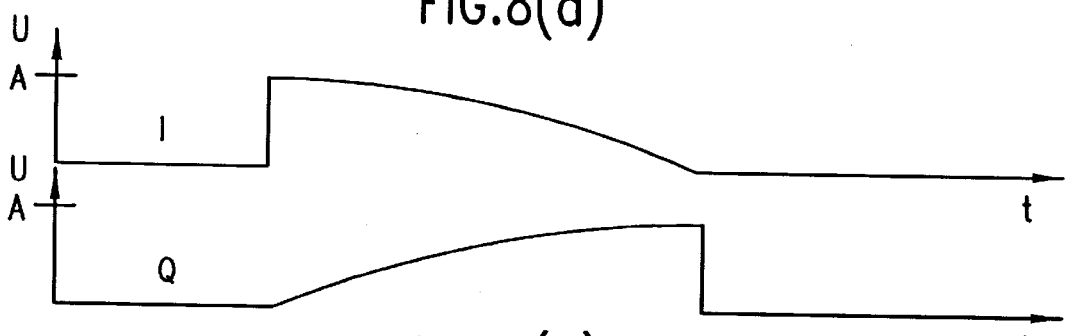
Figure 8C:
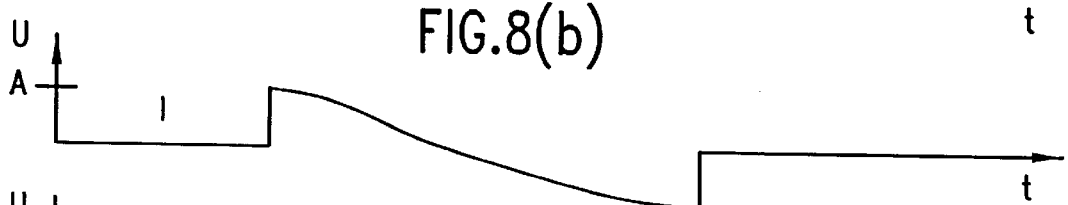
Figure 8D:
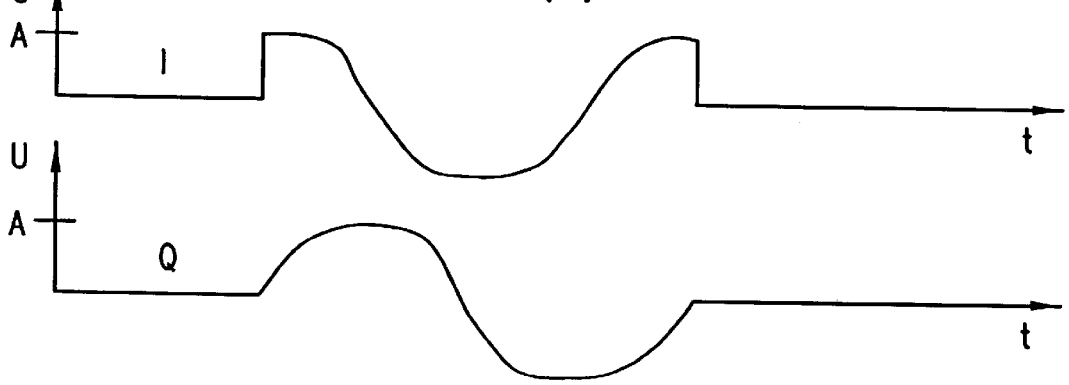
Figure 10:
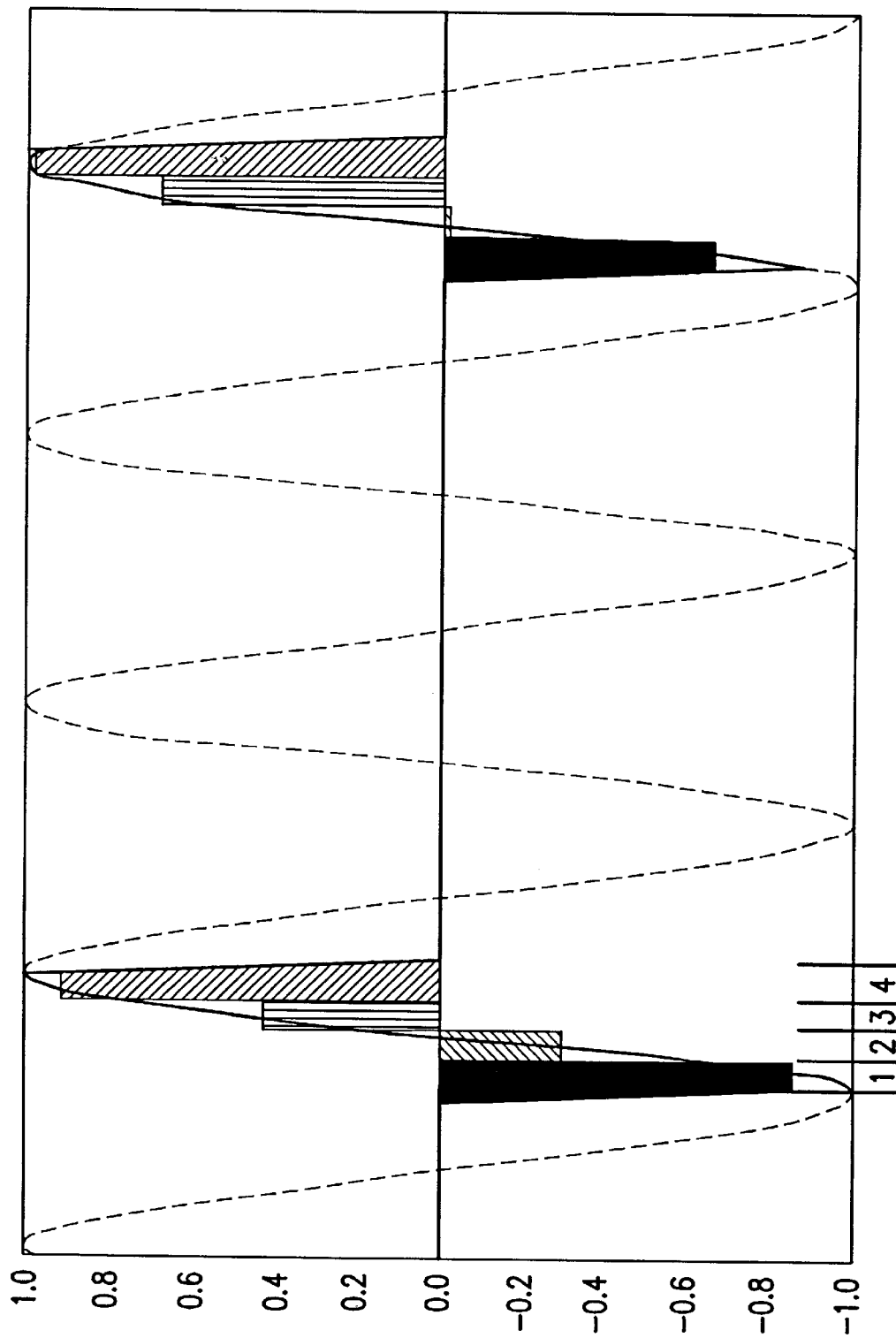
FIG. 10 is a wave diagram which illustrates the sampling of an echo pulse with four successive range cells.
Figure 11:
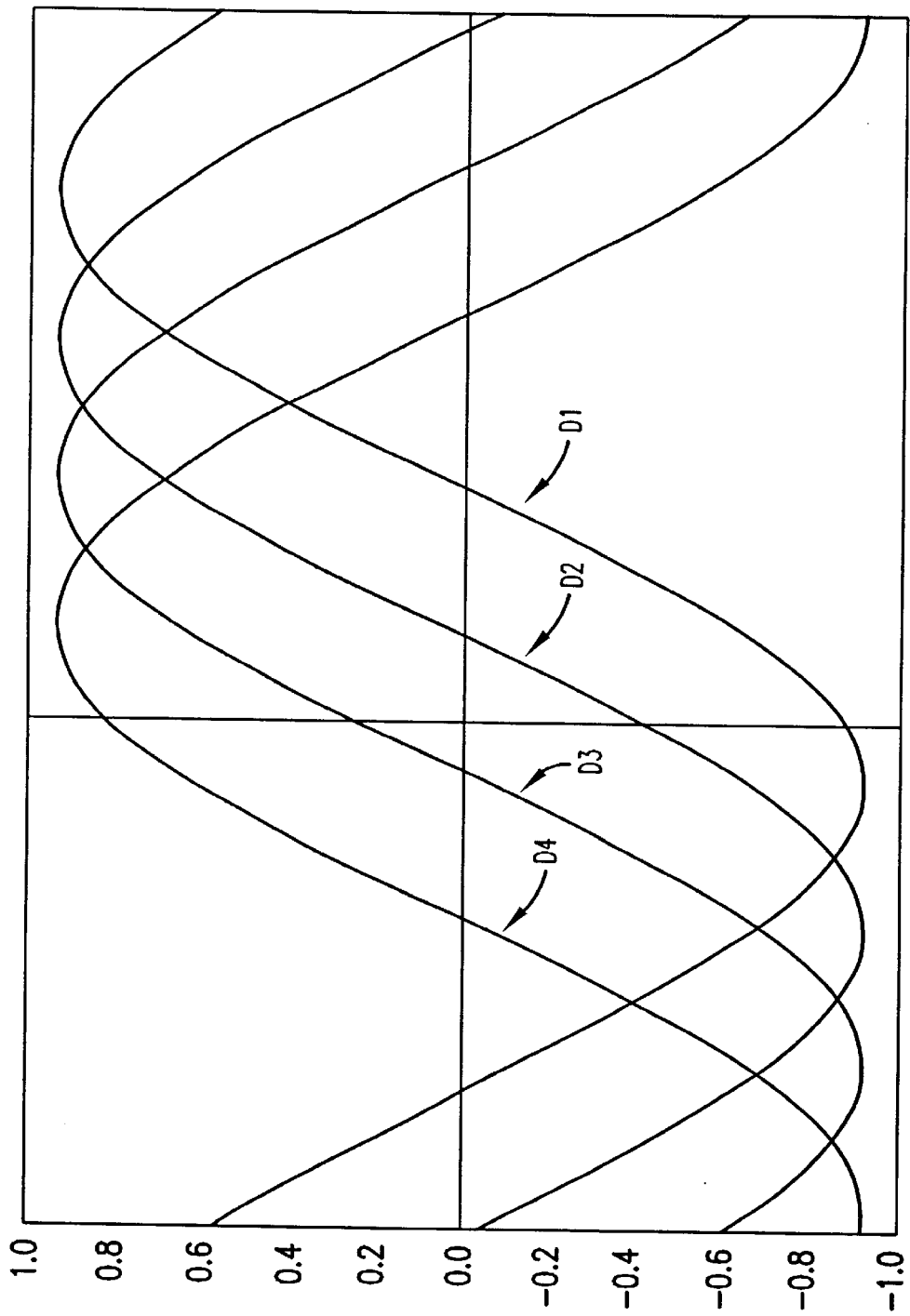
FIG. 11 illustrates the Doppler signals $D_1$–$D_4$ derived from the sampling signals in FIG. 10.

An example of the sampling of an echo pulse with 4 successive range cells is illustrated in FIG. 10, specifically for the example from FIG. 6 (that is, intermediate-frequency deviation different from zero). The sampling values are within the echo pulse. By means of this sampling 4 Doppler signals are obtained from one and the same target which have the same Doppler frequency, but a phase displacement with respect to one another is determined by the intermediate-frequency shift and the time intervals of the range cells. These Doppler signals D1, D2, D3, D4 are illustrated in FIG. 11. From the phase deviation and the knowledge of the sampling gate lengths, conclusions can be drawn on the intermediate-frequency deviation. In particular, this interrelationship is mathematically derived as follows.

Determination of the IF (Intermediate Frequency) Deviation $\Delta IF=IF-f_R$ from the Phase Displacement of Successively Sampled Doppler Signals The echo signal in the IF-plane with a Doppler frequency $f_D$ can be described as $$E_{IF}(t)=E_0 \cdot e^{j(\omega_{IF}+\omega_D) \cdot t}$$

$$\omega_{IF}=2\pi \cdot IF$$

$$\omega_D=2\pi f_D.$$

The reference signal with the frequency $f_R$ can be represented as $$R(t)=R_0 \cdot e^{j\omega_R t}$$

$$\omega_R=2\pi f_R.$$

By means of these two input signals, the video signal behind the I/Q-demodulator can be described as $$U_V(t)=U \cdot e^{j(\omega_{IF}+\omega_D-\omega_R) \cdot t}$$

The IF-deviation in this signal is $$\omega_{IF}-\omega_R =2\pi(IF-f_R)=2\pi \cdot \Delta IF=\Delta \omega_{IF}.$$

From (4) and (5), the following is obtained for the video signal $$U_c=U_0 e^{j(\Delta \omega_{IF}+\omega_D)t}$$

The sampling of the video signal takes place at different points in time which are displaced with respect to one another by the distance $\Delta T$. The following applies to two successive signals (1,2)

$$U_{V1}(t)=U \, e^{j(\Delta \omega_{IF}+\omega_D) \cdot t}$$

$$U_{V2}(t)=U \, e^{j(\Delta \omega_{IF}+\omega_D) \cdot (t+\Delta T)}.$$

The phases of the two Doppler signals are:

$$\varnothing_1(t)=(\Delta \omega_{IF}+\omega_D) \cdot t$$

$$\varnothing_2(t)=(\Delta \omega_{IF}+\omega_D) \cdot (t+\Delta T).$$

The difference of the phases at any point in time is $$\Delta \varnothing = \varnothing_2(\tau)-\varnothing_1(\tau)=(\Delta \omega_{IF}+\omega_D) \cdot \Delta T.$$

Taking into account the fact that, for a frequencypulse radar system, the relevant IF-deviation (MHz-range) is much larger than the Doppler shift of the echo signal (kHZ-range) because the IF-range must be located far above the Doppler frequency range, $$\Delta \omega_{IF} >> \omega_D$$

the following can be written with sufficient precision for the phase shift:

$$\Delta \varnothing = \Delta \omega_{IF} \cdot \Delta T.$$

The IF-deviation $\Delta IF$ is then obtained from the change of the phase over the time $$\frac{\Delta \varnothing}{\Delta T}=\frac{\Delta \omega_{IF} \cdot \Delta T}{\Delta T}=\Delta \omega_{IF}=2\pi \cdot \Delta IF.$$

For $\Delta$IF, the following is obtained from (12)

$$\Delta IF = \frac{1}{2\pi} \cdot \frac{\Delta \phi}{\Delta T}.$$

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. For use in a frequency-pulse radar system wherein echo signals from transmitted pulses are mixed with an intermediate frequency which is based on a reference frequency, a method for determining a deviation of said intermediate frequency relative to said reference frequency, said method comprising the steps of:

sampling echo pulses contained in an echo signal reflected from an individual target object, at a plurality of phase staggered points within one of a single echo pulse and successive echo pulses of said echo signal, to obtain sampled values thereof;

Doppler filtering said sampled values whereby a plurality of Doppler signals having the same frequency are generated; and determining said deviation of said intermediate frequency as a function of phase differences of said Doppler signals.

2. Method according to claim 1 wherein said sampling is performed at regular periodic time intervals within a single echo pulse of said echo signal.

3. Method according to claim 1 wherein said step of sampling echo pulses contained in said echo signal at a plurality of phase staggered points comprises:

maintaining a waveform of a transmitted signal constant; and maintaining a waveform of a transmitted signal constant; and increasing a sample rate of said sampling.

4. Method according to claim 1 wherein said step of sampling echo pulses contained in said echo signal at a plurality of phase staggered points comprises:

maintaining a waveform of a transmitted signal constant; and offsetting scanning points timewise from one echo pulse to a next succeeding echo pulse by a time delay which is equal to a pulse width of said pulses divided by a number of sampling values therein.

5. Method according to claim 1 wherein said step of sampling said echo signal at a plurality of points comprises:

lengthening a pulse width of a transmitted pulse so that it extends over a plurality of sampling points.

6. Method according to claim 1 wherein said step of determining said deviation comprises performing an FFT based on a phase of Doppler spectral lines after said Doppler filtering step.

7. Method of controlling a frequency shift of a frequency-pulse radar system wherein echo signals from transmitted pulses are mixed with an intermediate frequency which is based on a reference frequency, a method for determining a deviation of said intermediate frequency relative to said reference frequency, said method comprising the steps of:

sampling echo pulses contained in an echo signal reflected from an individual target object, at a plurality of phase staggered points within one of a single echo pulse and successive echo pulses of said echo signal, to obtain sampled values thereof;

Doppler filtering said sampled values whereby a plurality of Doppler signals having the same frequency are generated;

determining said deviation of said intermediate frequency as a function of phase differences of said Doppler signals; and controlling said intermediate frequency by means of a closed loop control, based on said deviation as determined in said determining step.

* * * * *